United States Patent
Rys (10) Patent No.: US 7,370,065 B1
(45) Date of Patent: May 6, 2008

(54) RENAMING MULTIPLE FILES

(75) Inventor: Cris Rys, San Diego, CA (US)

(73) Assignee: Adobe Systems Incorporated, San Jose, CA (US)

( * ) Notice: Subject to any disclaimer, the term of this patent is extended or adjusted under 35 U.S.C. 154(b) by 788 days.

(21) Appl. No.: 10/227,021

(22) Filed: Aug. 21, 2002

(51) Int. Cl.
*G06F 17/30* (2006.01)

(52) U.S. Cl. .................. 707/200; 707/104.1; 707/203; 707/205; 715/700; 715/764

(58) Field of Classification Search ................ 707/200, 707/203, 205, 104.1; 715/700, 764
See application file for complete search history.

(56) References Cited

U.S. PATENT DOCUMENTS

| | | | |
|---|---|---|---|
| 5,745,902 A * | 4/1998 | Miller et al. ................. | 707/200 |
| 6,629,104 B1 * | 9/2003 | Parulski et al. ............. | 707/102 |
| 6,784,925 B1 * | 8/2004 | Tomat et al. .......... | 348/207.11 |
| 2001/0038032 A1 * | 11/2001 | Kang et al. ................. | 235/375 |
| 2001/0056434 A1 * | 12/2001 | Kaplan et al. ........... | 707/104.1 |
| 2002/0049748 A1 * | 4/2002 | Iki et al. ........................ | 707/2 |

OTHER PUBLICATIONS

ACD System, "ACDSee 4.0 User Guide", 2001, pp. 57-59.*
Anonymous, "Renaming groups of Files with MultiRen", Windows Professional, Jul. 2000, p. 12.*
*Adobe Photoshop 7.0, Classroom in a Book*, Renaming image files in the File Browser, pp. 64-66, Adobe Systems Incorporated, Copyright 2002.
"Naming Digital Photo Files" at URL=http://www.microsoft.com/windowsxp/digitalphotography/getstarted/organize/naming.asp, posted May 1, 2002.
Microsoft Windows Help: "To change the name of a file or folder" at URL=mk:@MSITStore:C:\WINNT\Help\windows:chm::/windows_fcab_rename_file.htm; and "To display hidden files and folders" at URL:=mk:MSITStore:C:\WINNT\Help\foldercop.chm::/win_fcab_file_extensions.htm, Copyright 1990-1995
HTML Help Control Version 4.74.8793: "Enter numbers, text, a date, or a time" at URL=mk:@MSITStore:C:\Program%20Files\Microsoft%20Office\Office\1033\xlmain9.chm::/htm; and "Quickly fill in repeated entries in a column" at URL=mk:@MSITStore:C:\Program%20Files\Microsoft%20Office\Office\1033\xlmain9.chm::/htm, Copyright 1995-2000.

* cited by examiner

*Primary Examiner*—Khanh B. Pham
(74) *Attorney, Agent, or Firm*—Fish & Richardson P.C.

(57) ABSTRACT

Techniques for renaming multiple files. A system establishes a rename state for a first file in a collection of files and, in the rename state, receives user input specifying a name for the first file. In response to the user input specifying the name, the system renames the first file according to the name and establishes a rename state for a second file in the collection of files. In the rename state, the system can display both the current name of the file and the file extension associated with the file. The system can protect the file extension such that the user cannot change the file extension in the rename state.

33 Claims, 6 Drawing Sheets

RENAMING MULTIPLE FILES

BACKGROUND

The present invention relates to renaming files.

A file name is a string of characters that identifies a file. Most operating systems support file names up to 255 characters or more in length. In the Windows operating system, a file name can contain alphanumeric characters and also the following characters: ! @ # $ % & ( ) ' ` - { } ~ + , . ; = [ ] and the space character.

In some operating systems, a file extension can be appended to the end of a file name. A file extension specifies the file type and typically is represented as a delimiter character (e.g., a period character) plus additional characters (e.g., three alphanumeric characters). Many operating systems use file extensions to identify the file type or which application to invoke to open the file. For example, a file having a file extension of ".pdf" indicates to the operating system that the file is stored in portable document format and therefore must be opened using the Adobe Acrobat® program. Adobe Acrobat is a document management program available from Adobe Systems Incorporated of San Jose, Calif.

In some cases, a collection of files may consist of files whose names have been automatically generated by a computer. In such cases, the user may wish to rename some or all of the files in the collection so that the names are more meaningful or descriptive. For example, when a series of digital image files are downloaded from a digital camera into a software program such as Adobe Photoshop® also available from Adobe Systems Incorporated, the files are assigned computer-generated names such as DSGF001.JPG, DSGF002.JPG, and so on. The user may wish to rename the files to reflect, e.g., the subject matter of the image (e.g., YOSEMITE.JPG).

Renaming files can be tedious. Typically, multiple keystrokes are required to rename each file. For example, on the Apple Macintosh platform, renaming a file involves at least the following keystrokes: a first keystroke to select the file; a second keystroke to enter rename mode; and additional keystrokes to enter the new file name. Renaming multiple files requires repeating each of the above keystrokes for each file.

Besides being tedious, renaming files can also lead to loss of information. Because the entire file name, including the file extension, is typically modifiable during rename mode, the file extension can be erased or corrupted inadvertently during the renaming process. Erasing or corrupting the file extension may cause the operating system to be unable to open the file because the information that indicates which application to use has been lost.

SUMMARY

Methods and systems, including computer program products, implementing techniques for renaming files in a collection of files. The techniques include establishing a rename state for a first file in a collection of files; receiving input in the rename state, the input specifying a name for the first file; and in response to the input specifying the name, renaming the first file according to the specified name for the first file and establishing a rename state for a second file in the collection of files.

Particular implementations can include one or more of the following features. A file extension for the first file can be displayed in the rename state but protected such that the user cannot change the file extension in the rename state for the selected file. The system can generate a name for the second file, the generated name for the second file being derived from the specified name for the first file.

The invention can be implemented to realize one or more of the following advantages. The number of keystrokes required to rename multiple files can be reduced. The file extension can be protected during rename mode so that the extension is not inadvertently corrupted during file renaming. New file names for subsequent files in a collection of files can be automatically generated based on the file name of a previous file.

The details of one or more embodiments of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

Figure 1:
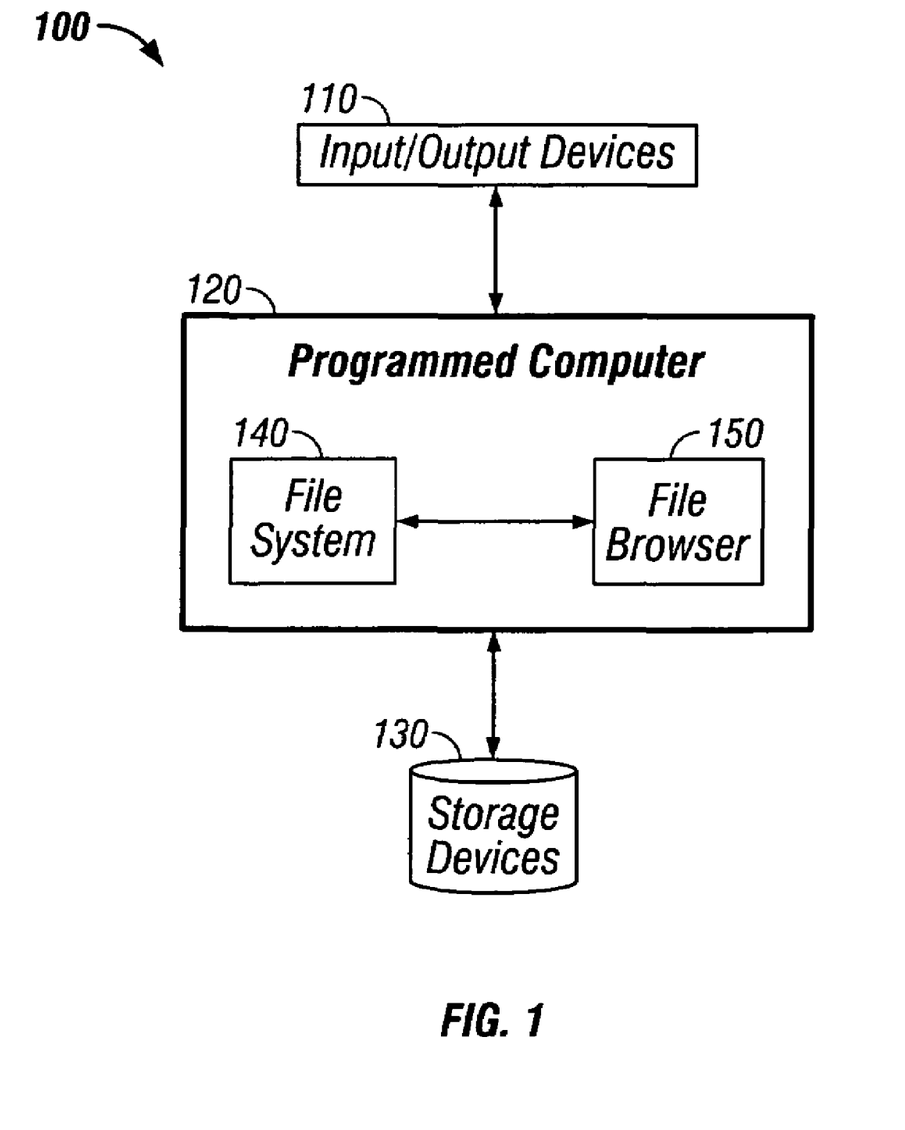
FIG. 1 is a block diagram illustrating a system for renaming files.

FIG. 1 shows a system 100 for renaming files. The system 100 includes input and output devices 110, a programmed computer 120, and storage devices 130. Running on the programmed computer 120 is a file system 140 and a file browser 150. A file browser 150 provides an interface for users to view and manipulate files within a file system. Typically, the file browser 150 displays the files in a hierarchical directory structure. Users can manipulate or customize the directory structure through the browser interface. Users can also perform basic file operations such as copying, deleting, and renaming files. The file browser 150 can be a stand-alone application, such as the Windows Explorer tool that comes bundled with the Windows operating systems available from Microsoft Corporation of Redmond, Wash. Alternatively, the file browser 150 can be subsumed within an application such as an image processing application or a database application.

Figure 2:
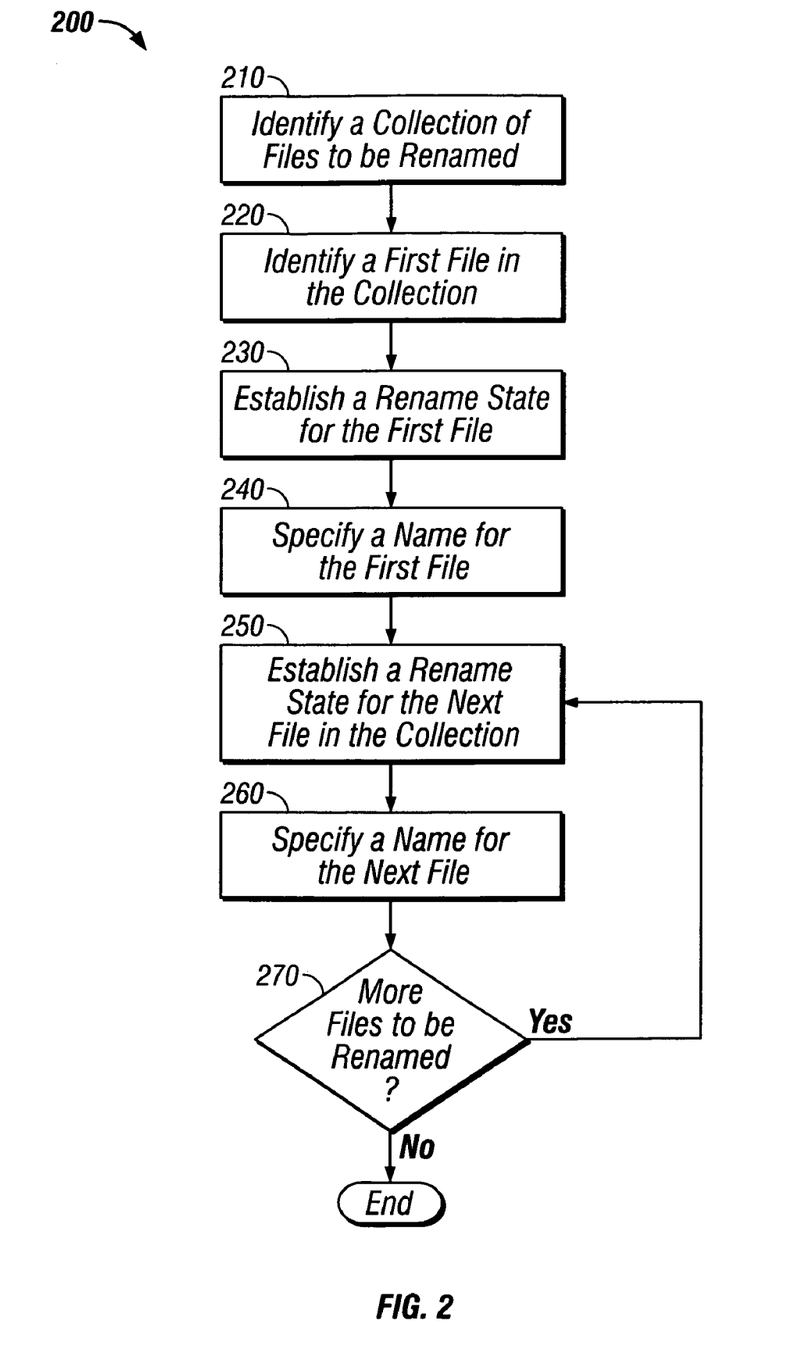
FIG. 2 is a flow diagram illustrating of a method for renaming files.

FIG. 2 is a flow diagram illustrating a computer-implemented method 200 for renaming files in a collection of files. The method steps can be performed by the programmed computer 120 during execution of the file browser program 150.

The method 200 begins when the system 100 identifies a collection of files to be renamed (step 210). The system 100 can identify the collection of files based on user input. For example, the user can select a particular subdirectory of files, or individual files in a directory or subdirectory, within the file system 140. Alternatively, the system 100 can identify the collection of files based on pre-defined settings.

Figure 3:
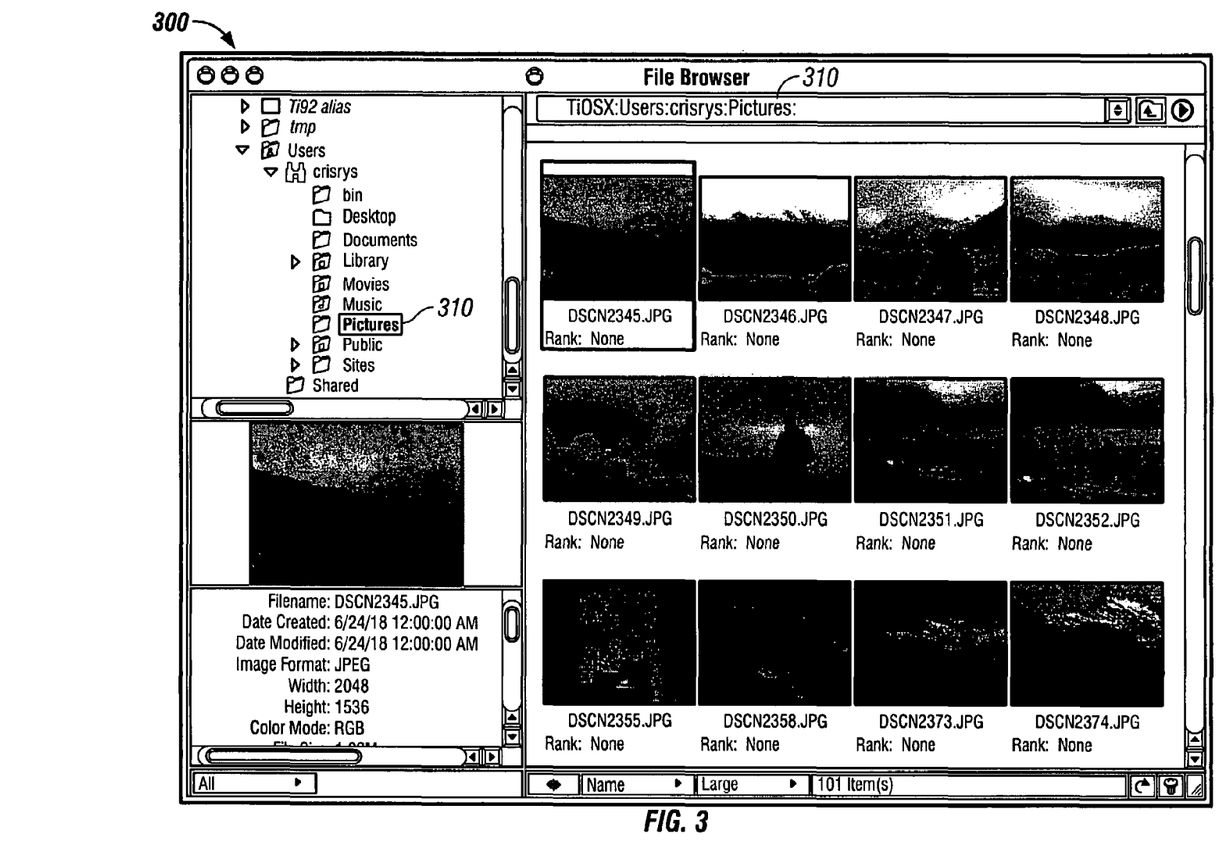
FIG. 3 is a screen shot of an exemplary user interface for a file browser program.

For example, if the method 200 is running within a particular application, the system 100 can identify either a certain directory that is associated with the application (e.g., a "My Documents" or "My Pictures" folder) or a collection of files within the file system having a format compatible with the application (e.g., JPG format). FIG. 3 shows a collection of files which the system has identified based on the user selection of the subdirectory Pictures 310.

The collection of files can reside within a file system, a database or any other storage system. The files within the collection can be ordered such that each file has a designated position within the collection. The files can be sorted according to user input or a pre-determined scheme (e.g., by filename, creation date, file type and so on).

Once the system 100 has identified a collection of files to be renamed, the system 100 identifies a first file (220). The system 100 can identify the first file in response to user input selecting a file in the collection of files. Alternatively, the system 100 can identify the first file based on a pre-determined scheme (e.g., the first file in the collection, the first file in the collection that has a randomly-generated file name, and so on).

Figure 4:
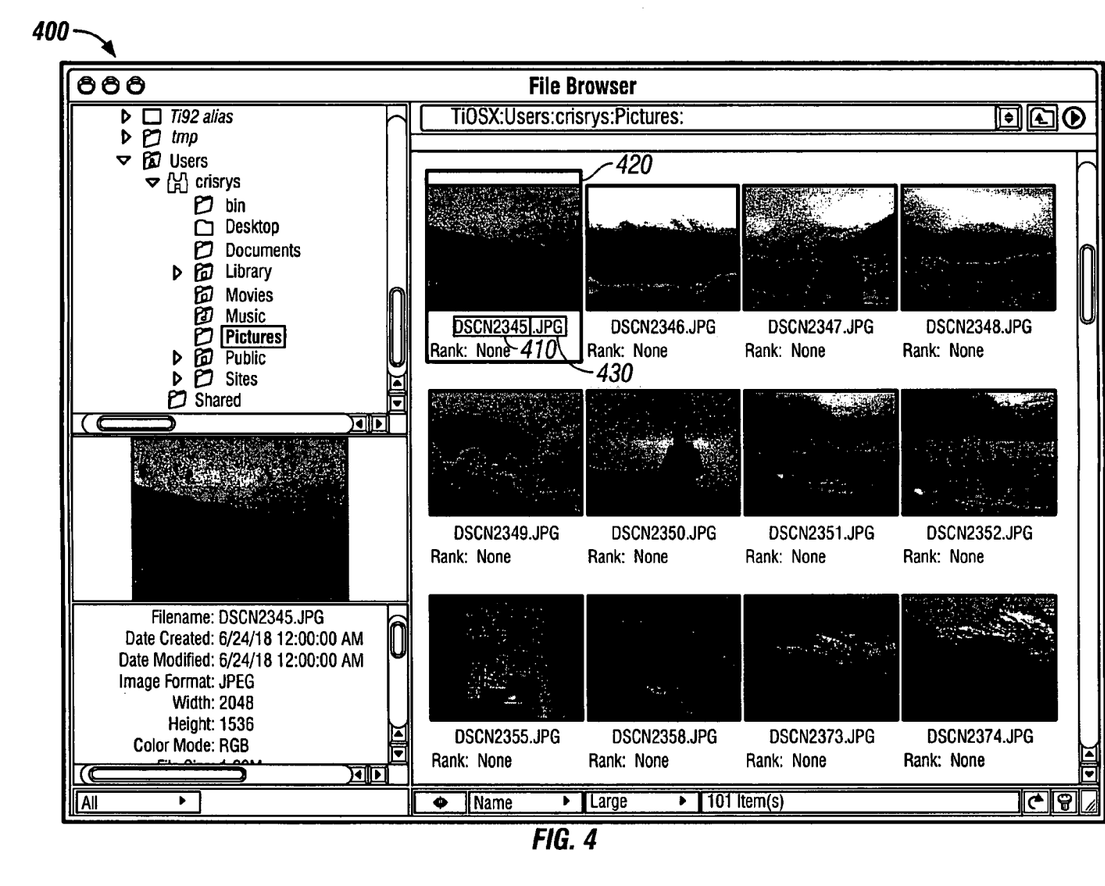
FIG. 4 is a screen shot of an exemplary user interface for establishing a rename state for a selected file.

After identifying a first file, the system 100 establishes a rename state for the first file (step 230). The system can establish the rename state in response to user input requesting that the first file be placed in a rename state. During the rename state, the system 100 can provide an interface for a user to view the current name and specify a name for the first file. As shown in FIG. 4, a user interface 400 displays a highlighted representation of the current name "DSCN2345.JPG" 410 for the selected file 420. The highlighting indicates to the user that the current file name 410 has been placed in rename state.

In one implementation, the system 100 protects the file extension (including the delimiter) so that it cannot be changed during the rename state. This implementation is illustrated in FIG. 4 by the fact that the file extension 430 is displayed but not highlighted. The lack of highlighting indicates to the user that the file extension 430 cannot be changed during the rename state. The system can protect the file extension 430 by other means—for example, the system can hide the file extension from view.

Figure 5:
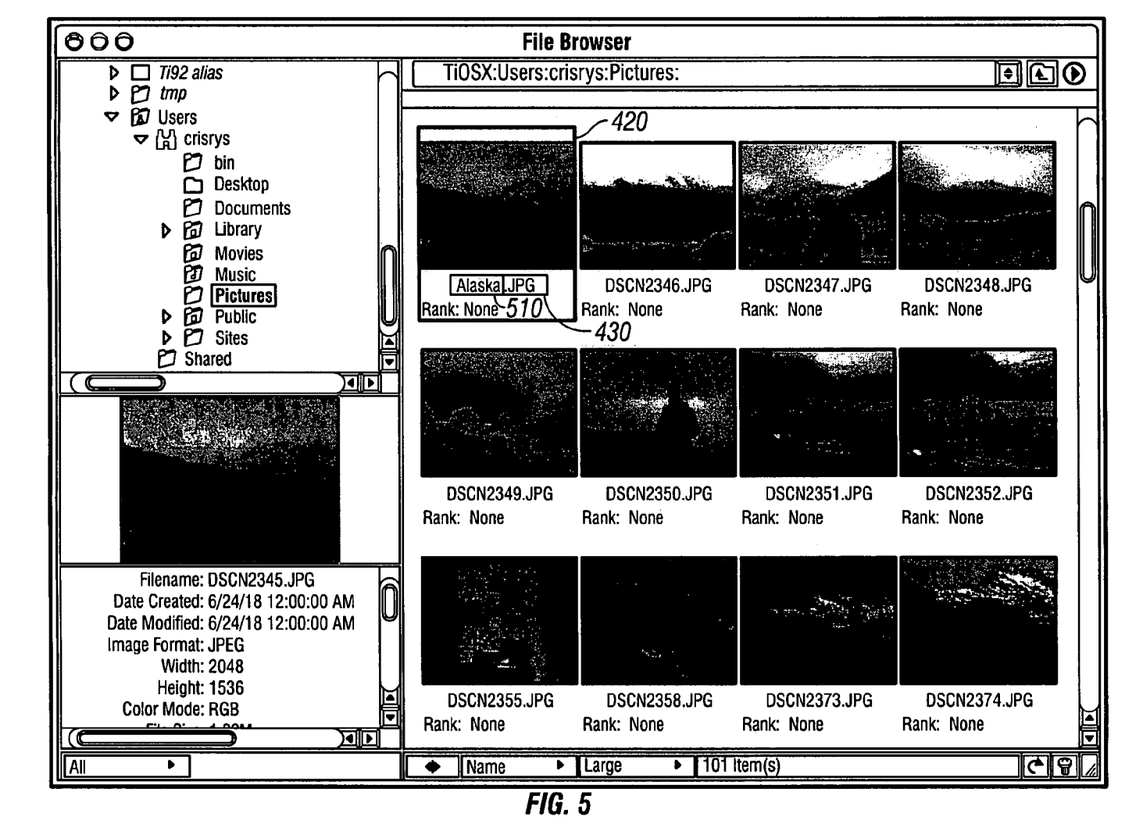
FIG. 5 is a screen shot of an exemplary user interface for specifying a name for a selected file.

In the rename state, the system 100 receives input specifying a name for the first file (step 240). The specified name can be a new, modified, or original name for the first file. As shown in FIG. 5, the user can enter a new name "Alaska" 510 by typing over the old file name 410 in the user interface and accepting the name by striking a termination key (e.g., enter, tab, or the like) which indicates to the computer that the user has finished typing in the name. Prior to hitting the termination key, the user could, for example, re-type the name. Thus, the name is not specified until the user has struck the termination key to accept the name.

Figure 6:
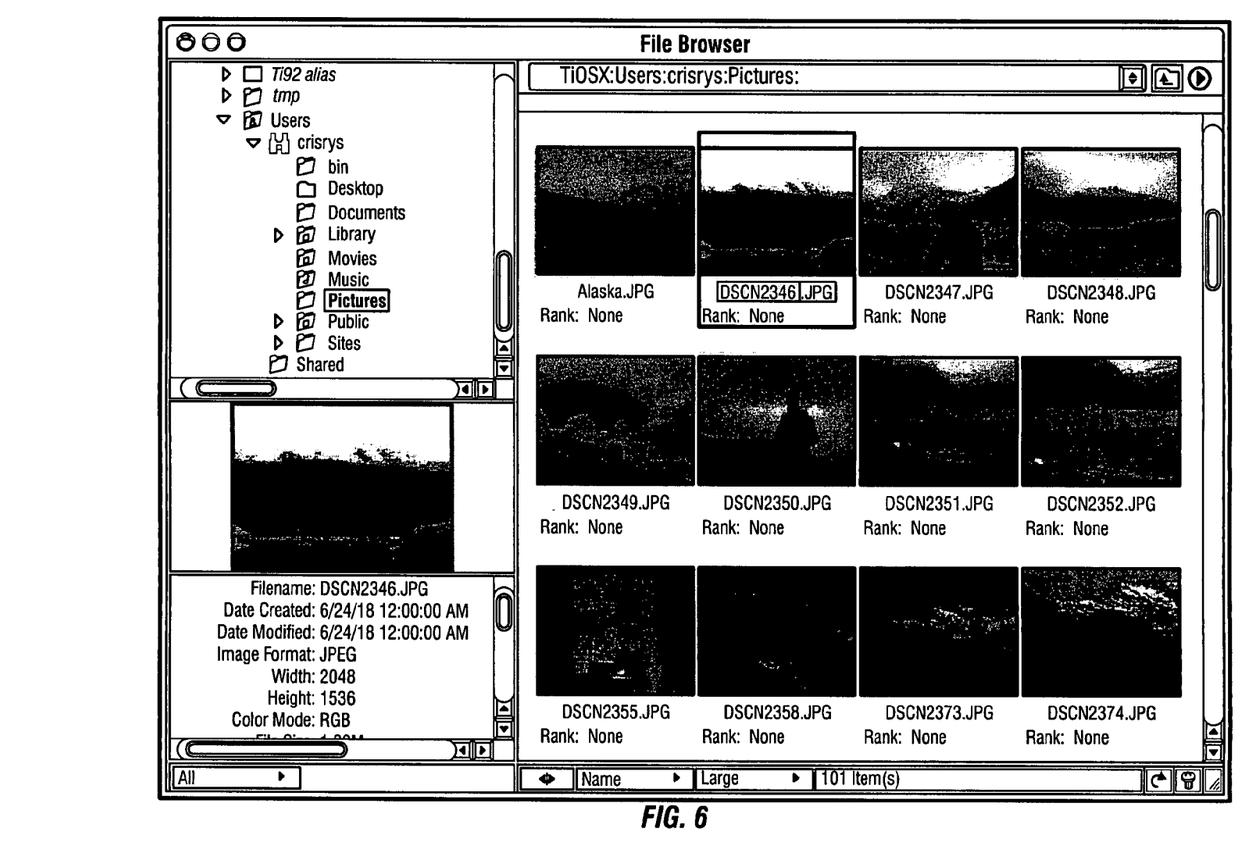
FIG. 6 is a screen shot of an exemplary user interface for renaming a selected file according and establishing rename state for a second file.

Once the name is specified, the system 100 automatically renames the selected file according to the specified name, proceeds to the next file in the collection of files and establishes a rename state for the next file (step 250). As discussed above in the context of step 230, the system 100 can display the current name for the next file and prompt the user for input specifying a name, as shown in FIG. 6. After receiving input specifying a name for the next file (step 260), if more files remain to be renamed in the collection of files (the YES branch of step 270), the system repeats steps 250 and 260. When no more files in the collection remain to be renamed (the NO branch of step 270), the method is complete.

In some implementations, instead of displaying the current name for the next file, the system 100 can display a computer-generated name for the next file. The computer-generated name can be based on the specified name of the first file. In one implementation, the system 100 can use the specified name of the first file as a base name to which the system appends one or more additional suffix characters to generate names for subsequent files in the collection of files. The system 100 can provide an interface for users to select a desired suffix from a list of suffixes (e.g., sequential numbers, dates, times and so on). After displaying the computer generated name (e.g., "Alaska01" or "Alaska25Dec2001") in step 250, the system 100 waits to receive input specifying a name in step 260. If the user is not satisfied with the computer-generated name, the user can make changes to the name. Otherwise, if the user is satisfied with the computer-generated name, the user can strike the termination key to accept the computer-generated name without changes. After receiving this input, the system proceeds to the next file as discussed above.

In another implementation, the system 100 can use the name of the first file as a base name, but the system 100 does not automatically append suffix characters to the base name. Instead, the system 100 displays the base name and prompts the user to complete the name by adding any desired additional characters (e.g., the name of a particular location, person, or object in an image) to distinguish the current file from other files in the collection.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, although the invention has been described in terms of its application to renaming image files, the invention can apply to any other type of media file or file (e.g. mp3 files, HTML files, and so on). The invention is also not limited to files or files stored in a file system, but can be applied to any other type of object for which a user can set an identifier or name. For example, the invention can be applied to renaming records in a database, renaming network identifiers associated with network IP (Internet Protocol) addresses, or renaming names of programming modules in source code. Additionally, the steps of the invention can be performed in a different order and still achieve desirable results.

What is claimed is:

1. A computer program product, tangibly stored on a computer-readable medium, comprising instructions operable to cause a programmable processor to perform the actions of:
   displaying a collection of files in a file browser display, each file in the collection having a filename, the collection of files having a predefined order;
   receiving user input requesting that a single file in the collection be placed into a rename state, every file in the collection being eligible to be the single file;
   placing the single file in the rename state;
   receiving, directly in the file browser display, user input changing the name of the single file while the file is in the rename state; and
   terminating the rename state for the single file when the name is changed and automatically placing a next file in the rename state, the next file following the single file in the predefined order.

2. The computer program product of claim 1, wherein:
   the user input changing the name of the single file includes user input accepting the name for the single file as complete.

3. The computer program product of claim 1, wherein:
   placing the single file in the rename state includes providing a user interface for a user to specify a name for the single file.

4. The computer program product of claim 3, wherein:
   the name of the single file includes a file extension; and
   providing a user interface for a user to specify a name for the single file includes protecting the file extension such that the user cannot change the file extension in the rename state.

5. The computer program product of claim 4, wherein:
   the file extension is displayed as part of a representation of the name of the single file.

6. The computer program product of claim 1, further comprising:
   before receiving user input requesting that the single file be placed into the rename state, receiving user input defining the collection of files from a plurality of available files.

7. The computer program product of claim 1, wherein:
   the file browser display is included in an application program;
   the collection of files is a collection of files having a format compatible with the application program; and
   the single file is placed in the rename state in the application program.

8. The computer program product of claim 1, further comprising instructions operable to cause a programmable processor to perform the action of:
   displaying a computer-generated name for the next file, the computer-generated name for the next file being based on the changed name for the single file.

9. The computer program product of claim 8, wherein:
   the computer-generated name for the next file is also based on metadata associated with the next file.

10. The computer program product of claim 8, wherein:
   the computer-generated name for the next file includes an index.

11. The computer program product of claim 9, wherein:
   the metadata associated with the next file includes a date, a time, or both.

12. A computer-implemented method comprising:
   displaying a collection of files in a file browser display, each file in the collection having a filename, the collection of files having a predefined order;
   receiving user input requesting that a single file in the collection be placed into a rename state, every file in the collection being eligible to be the single file;
   placing the single file in the rename state;
   receiving, directly in the file browser display, user input changing the name of the single file while the file is in the rename state; and
   terminating the rename state for the single file when the name is changed and automatically placing a next file in the rename state, the next file following the single file in the predefined order.

13. The method of claim 12, further comprising displaying a computer-generated name for the next file, the computer-generated name for the next file being based on the changed name for the single file.

14. The method of claim 13, wherein the computer-generated name for the next file is also based on metadata associated with the next file.

15. The method of claim 14, wherein the metadata associated with the next file includes a date, a time, or both.

16. The method of claim 13, wherein the computer-generated name for the next file includes an index.

17. The method of claim 12, wherein the user input changing the name of the single file includes user input accepting the name for the single file as complete.

18. The method of claim 12, wherein placing the single file in the rename state includes providing a user interface for a user to specify a name for the single file.

19. The method of claim 18, wherein:
   the name of the single file includes a file extension; and
   providing a user interface for a user to specify a name for the single file includes protecting the file extension such that the user cannot change the file extension in the rename state.

20. The method of claim 19, wherein the file extension is displayed as part of a representation of the name of the single file.

21. The method of claim 12, further comprising before receiving user input requesting that the single file be placed into the rename state, receiving user input defining the collection of files from a plurality of available files.

22. The method of claim 12, wherein:
   the file browser display is included in an application program;
   the collection of files is a collection of files having a format compatible with the application program; and the single file is placed in the rename state in the application program.

23. A system comprising:

an output device; and a computer programmed to perform operations comprising:

displaying a collection of files in a file browser display in the output device, each file in the collection having a filename, the collection of files having a predefined order;

receiving user input requesting that a single file in the collection be placed into a rename state, every file in the collection being eligible to be the single file;

placing the single file in the rename state;

receiving, directly in the file browser display, user input changing the name of the single file while the file is in the rename state; and     terminating the rename state for the single file when the name is changed and automatically placing a next file in the rename state, the next file following the single file in the predefined order.

24. The system of claim 23, the operations further comprising displaying a computer-generated name for the next file, the computer-generated name for the next file being based on the changed name for the single file.

25. The system of claim 24, wherein the computer-generated name for the next file is also based on metadata associated with the next file.

26. The system of claim 25, wherein the metadata associated with the next file includes a date, a time, or both.

27. The system of claim 24, wherein the computer-generated name for the next file includes an index.

28. The system of claim 23, wherein the user input changing the name of the single file includes user input accepting the name for the single file as complete.

29. The system of claim 23, wherein placing the single file in the rename state includes providing a user interface for a user to specify a name for the single file.

30. The system of claim 29, wherein:

the name of the single file includes a file extension; and providing a user interface for a user to specify a name for the single file includes protecting the file extension such that the user cannot change the file extension in the rename state.

31. The system of claim 30, wherein the file extension is displayed as part of a representation of the name of the single file.

32. The system of claim 23, the operations further comprising before receiving user input requesting that the single file be placed into the rename state, receiving user input defining the collection of files from a plurality of available files.

33. The system of claim 23, wherein:

the file browser display is included in an application program;

the collection of files is a collection of files having a format compatible with the application program; and the single file is placed in the rename state in the application program.

* * * * *